Sept. 24, 1957 R. J. BURNS 2,807,399
CONTAINER HOLDER
Filed Nov. 25, 1955
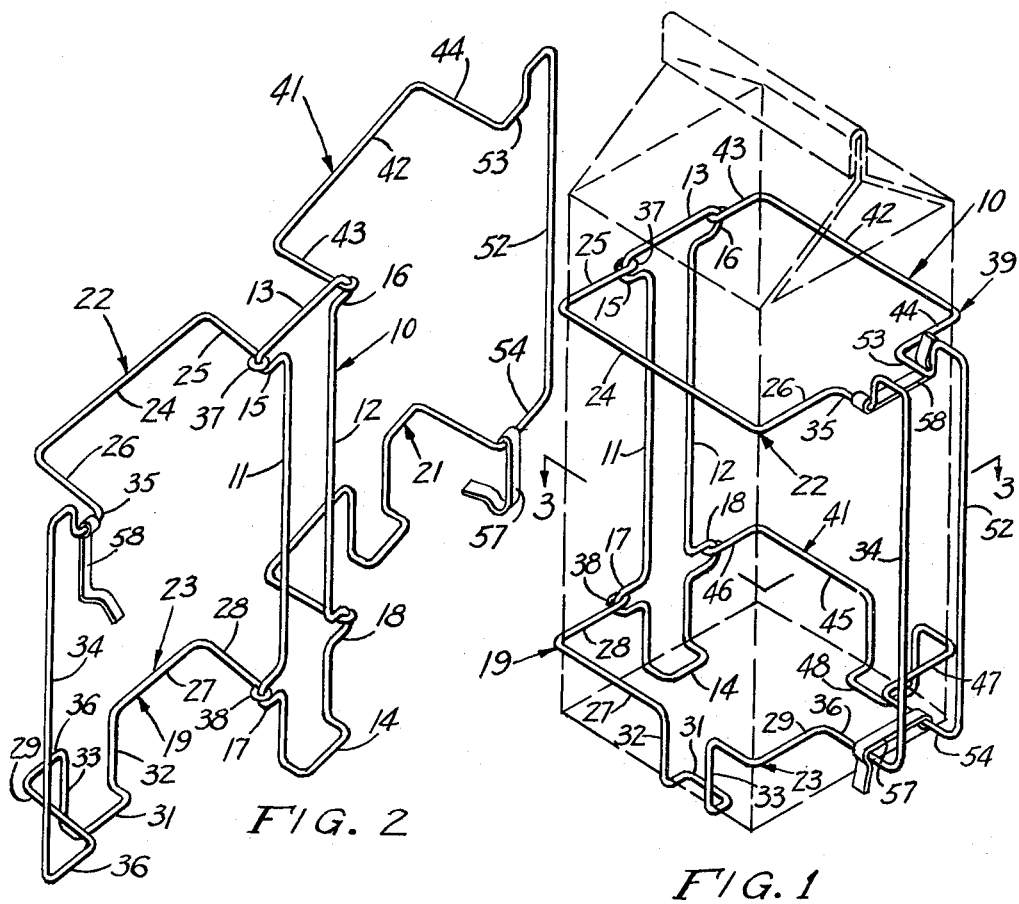
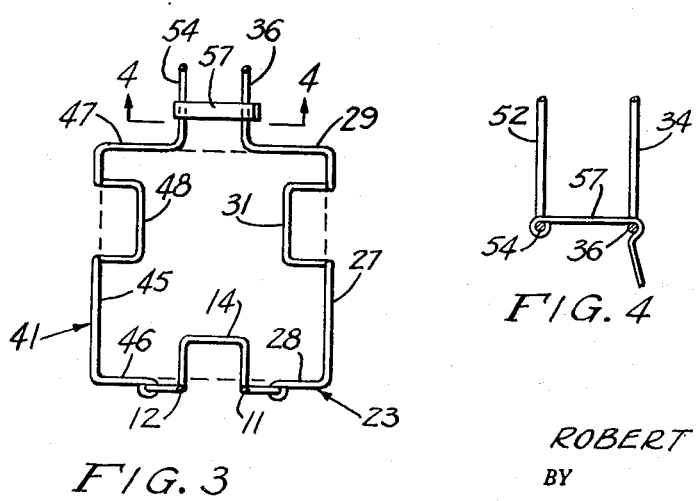
INVENTOR.
ROBERT J. BURNS
BY
McMorrow, Berman + Davidson
ATTORNEYS

United States Patent Office 2,807,399
Patented Sept. 24, 1957

2,807,399

CONTAINER HOLDER

Robert J. Burns, Morrisville, Vt.

Application November 25, 1955, Serial No. 548,910

3 Claims. (Cl. 224—45)

The present invention relates to a removable holder for a container.

An object of the present invention is to provide a removable holder for a compressible container of the type which is fabricated of waxed cardboard and is normally filled with milk, fruit juice, or other commodity, and has a heavily-waxed outer surface difficult to hold while pouring the contents of the container.

Another object of the present invention is to provide a removable holder for a compressible container, such as a milk carton, and one which is collapsible when not in use, and one which is easily and quickly attached to a container and has positive locking means for detachably securing it to the container.

A further object of the present invention is to provide a removable holder for a compressible container which is sturdy in construction, one of simple structure and of few parts, and one which is economically feasible.

These and other objects and advantages of the present invention will be fully apparent from the following description when taken in connection with the annexed drawing, in which:

Figure 1 is a perspective view of the holder of the present invention in closed position, the dotted line showing indicating a container held within the holder, Figure 2 is a perspective view of the holder in open position, Figure 3 is a sectional view, on a reduced scale, taken on the line 3—3 of Figure 1, and Figure 4 is a fragmentary view, on an enlarged scale, taken on the line 4—4 of Figure 3.

Referring in greater detail to the drawing in which like numerals indicate like parts throughout the several views, the container holder of the present invention comprises an upstanding support frame 10 which includes a pair of bars 11 and 12 arranged in side by side spaced relation and a crossbar 13 connecting the upper ends of the bars 11 and 12 together. A horizontally-disposed foot 14 is positioned forwardly of one face of the bars 11 and 12 and connects the lower ends of the bars 11 and 12 together.

Each of the bars 11 and 12 have loops 15 and 16, respectively, adjacent the crossbar 13 and loops 17 and 18, respectively, adjacent to and spaced above the foot 14. The loops 15 and 16 are arranged in opposed relation and face away from each other and the loops 17 and 18 are also arranged in opposed relation and face away from each other.

A half section embracing upstanding frame 19 is positioned longitudinally of and on one side of the support frame bar 11 and another half section embracing upstanding frame 21 is positioned longitudinally of and on the other side of the support frame bar 12. The half section frame 19 includes a pair of horizontally-disposed U-shaped members 22 and 23 arranged in superimposed spaced relation. The member 22 includes a bight 24 and legs 25 and 26 projecting from the ends of the bight 24 with the leg 25 being shorter than the leg 26. The U-shaped member 23 includes a bight 27 and legs 28 and 29 projecting from the ends of the bight 27, the leg 28 being shorter than the leg 29. The U-shaped members 22 and 23 are positioned so that the bights 24 and 27, respectively, are rearwardly of and spaced from the other face of the support frame bars 11 and 12, with the shorter legs 25 and 28, respectively, adjacent the loops 15 and 17, respectively, of the support frame bar 11 and with the longer legs 26 and 29 remote from the bar 11.

The half section frame 19 includes another horizontally-disposed foot 31 facing in the same direction as the foot 14 and dependingly connected by means of vertical portions 32 and 33 of the U-shaped member 23 to the U-shaped member 23. The foot 31 is on the same level as the foot 14.

A vertically-disposed U-shaped element having a bight 34 and legs 35 and 36 is positioned so that the legs 35 and 36 are exteriorly of and perpendicular to the longer legs 26 and 29 and have their free ends connected to the free ends of the longer legs 26 and 29.

Means is provided on each of the shorter legs 25 and 28 of the U-shaped members 22 and 23, respectively, for connecting the U-shaped members 22 and 23 to the loops 15 and 17 on the support frame bar 11 for movement of the half section frame 19 from the longitudinal position to a position at a right angle with respect to the support frame 10. Specifically, this means embodies eye formations 37 and 38 on the ends of the shorter legs 25 and 28, respectively, embracingly receiving the bights of the loops 15 and 17, respectively.

The half section frame 21 is identical in construction to the frame 19 and includes U-shaped members 39 and 41. The member 39 has a bight 42, a short leg 43 projecting from one end of the bight 42 and a long leg 44 projecting from the other end of the bight 42. The U-shaped member 41 has a bight 45 and legs 46 and 47 projecting from its ends, the leg 46 being shorter than the leg 47. Bights 42 and 45 of the U-shaped members 39 and 41, respectively, are positioned rearwardly of and spaced from the face of the support frame bars 11 and 12 opposite to the face having the foot 14.

The bight 45 of the U-shaped member 41 has a foot 48 dependingly connected to it by means of vertical portions 49 and 51 of the bight 45, the foot 48 facing in the same direction as the foot 14 and being on the same level with the foot 14.

The half section frame 21 includes another vertically-disposed U-shaped element having a bight 52 and legs 53 and 54, the U-shaped element being positioned so that its legs 53 and 54 are exteriorly of and perpendicular to the legs 44 and 47 and have their free ends connected to the free ends of the legs 44 and 47, respectively.

Eye formations 55 and 56 on the legs 43 and 46, respectively, provide the means by which the half section frame 21 is connected to the loops 16 and 18 on the bar 12 for movement from the longitudinal position as seen in Figure 3 to the position at a right angle to the support frame 10 as seen in Figure 2.

When the half section frames 19 and 21 have been moved to their right angle positions with respect to the support frame 10, the bights 34 and 52 of the U-shaped elements of those frames 19 and 21, respectively, form a compound handle.

A spring clip 57 having a loop at one end slidably surrounding the leg 54 of the U-shaped element of the frame 21 has its other end bent to form a latch engaging the leg 36 of the U-shaped element of the frame 19, as seen in Figure 2. A similar clip 58 having a loop at one end slidably surrounding the leg 35 of the U-shaped element of the frame 19 has its other end bent to form a latch engaging the leg 53 of the U-shaped element of the frame 21. While shown mounted for sliding and rotational movement upon the legs 54 and 35, the spring clips 57 and 58 may be mounted upon both the legs of the U-shaped element of either of the frames 19 or 21 as desired.

The spring clips 57 and 58 form cooperating fastening elements for securing the bights 34 and 52 together as a handle when the frames 19 and 21 have been moved to their right-angle positions with respect to the support frame 10.

In use, the container holder of the present invention is secured around a container such an the milk carton 59 shown in Figures 1 with the frames 19 and 21 embracingly engaging the sides of the carton 59 and conformably shaped to snugly fit therearound. The feet 14, 31, and 48 support the carton bottom and the handle formed by the bights 34 and 52 enables the user to conveniently lift the carton 59 to pour the contents therefrom. For temporary use, the spring clips 57 and 58 do not need to be engaged with the respective ones of the legs 36 and 53, although for more permanent use or storage the clips 57 and 58 may be used to lock the frames 19 and 21 about the carton 59.

Preferably, the support frame 10 and the half section frames 19 and 21 are formed from a rigid wire or rod material such as brass, aluminum, stainless steel, or the like, although other materials if rigid may be used if practical.

What is claimed is:

1. A holder for a container comprising an upstanding support frame including a pair of bars arranged in side by side spaced relation, a crossbar connecting the upper ends of said bars together, and a horizontally-disposed foot positioned forwardly of one face of said bars and connecting the lower ends of said bars together, each of said bars having a loop adjacent said crossbar and another loop adjacent to and spaced above said foot, the loops adjacent said crossbar and those adjacent to and spaced above said foot being arranged in opposed relation and facing away from each other, a half section embracing upstanding frame positioned longitudinally of and on one side of each of said support frame bars, each of said half section frames including a pair of horizontally-disposed U-shaped members arranged in superimposed spaced relation, each of said members of each half section frame including a bight and a leg projecting from each end of said bight with one of said legs being shorter than the other of said legs, the members of each half section frame being positioned so that the bights are rearwardly of and spaced from the other face of said support frame bars with the shorter legs adjacent the loops of the adjacent support frame bar and the longer legs remote from the said adjacent support frame bar, another horizontally-disposed foot facing in the same direction as said first-named foot and dependingly connected to the bight of the lower one of said members of each of said half section frames, both of said another feet being on the same level as said first-named foot, a vertically-disposed U-shaped element positioned so that its legs are exteriorly of and perpendicular to the longer legs of said U-shaped members of each of said half section frames with the free ends of its legs connected to the free ends of the longer legs of the adjacent U-shaped members, and means on each of the shorter legs of said U-shaped members of each half section frame connecting same to the loops on the adjacent support frame bars for movement of said half section frames from the longitudinal position to positions at right angles with respect to said support frame.

2. A holder for a container comprising an upstanding support frame including a pair of bars arranged in side by side spaced relation, a crossbar connecting the upper ends of said bars together, and a horizontally-disposed foot positioned forwardly of one face of said bars and connecting the lower ends of said bars together, each of said bars having a loop adjacent said crossbar and another loop adjacent to and spaced above said foot, the loops adjacent said crossbar and those adjacent to and spaced above said foot being arranged in opposed relation and facing away from each other, a half section embracing upstanding frame positioned longitudinally of and on one side of each of said support frame bars, each of said half section frames including a pair of horizontally-disposed U-shaped members arranged in superimposed spaced relation, each of said members of each half section frame including a bight and a leg projecting from each end of said bight with one of said legs being shorter than the other of said legs, the members of each half section frame being positioned so that the bights are rearwardly of and spaced from the other face of said support frame bars with the shorter legs adjacent the loops of the adjacent support frame bar and the longer legs remote from the said adjacent support frame bar, another horizontally-disposed foot facing in the same direction as said first-named foot and dependingly connected to the bight of the lower one of said members of each of said half section frames, both of said another feet being on the same level as said first-named foot, a vertically-disposed U-shaped element positioned so that its legs are exteriorly of and perpendicular to the longer legs of said U-shaped members of each of said half section frames with the free ends of its legs connected to the free ends of the longer legs of the adjacent U-shaped members, and means on each of the shorter legs of said U-shaped members of each half section frame connecting same to the loops on the adjacent support frame bars for movement of said half section frames from the longitudinal position to positions at right angles with respect to said support frame, the bights of said U-shaped elements when the half section frames have been moved to their right-angle position with respect to said support frame together forming a handle.

3. A holder for a container comprising an upstanding support frame including a pair of bars arranged in side by side spaced relation, a crossbar connecting the upper ends of said bars together, and a horizontally-disposed foot positioned forwardly of one face of said bars and connecting the lower ends of said bars together, each of said bars having a loop adjacent said crossbar and another loop adjacent to and spaced above said foot, the loops adjacent said crossbar and those adjacent to and spaced above said foot being arranged in opposed relation and facing away from each other, a half section embracing upstanding frame positioned longitudinally of and on one side of each of said support frame bars, each of said half section frames including a pair of horizontally-disposed U-shaped members arranged in superimposed spaced relation, each of said members of each half section frame including a bight and a leg projecting from each end of said bight with one of said legs being shorter than the other of said legs, the members of each half section frame being positioned so that the bights are rearwardly of and spaced from the other face of said support frame bars with the shorter legs adjacent the loops of the adjacent support frame bar and the longer legs remote from the said adjacent support frame bar, another horizontally disposed foot facing in the same direction as said first-named foot and dependingly connected to the bight of the lower one of said members of each of said half section frames, both of said another feet being on the same level as said first-named foot, a vertically-disposed U-shaped element positioned so that its legs are exteriorly of and perpendicular to the longer legs of said U-shaped members of each of said half section frames with the free ends of its legs connected to the free ends of the longer legs of the adjacent U-shaped members, means on each of the shorter legs of said U-shaped members of each half section frame connecting same to the loops of the adjacent support frame bars for movement of said half section frames from the longitudinal position to positions at right angles with respect to said support frame, and cooperating fastening elements on the legs of said U-shaped elements for securing said last-named bights together when said half section frames have been moved to their right-angle positions with respect to said support frame.

References Cited in the file of this patent

UNITED STATES PATENTS

| | | |
|---|---|---|
| 1,584,857 | Hobbs | May 18, 1926 |
| 2,408,611 | Dawson | Oct. 1, 1946 |
| 2,730,278 | Sherlowsky | Jan. 10, 1956 |
| 2,755,977 | Malcolm | July 24, 1956 |